US011914789B2

(12) United States Patent
Chen et al.

(10) Patent No.: US 11,914,789 B2
(45) Date of Patent: Feb. 27, 2024

(54) METHOD FOR INPUTTING LETTERS, HOST, AND COMPUTER READABLE STORAGE MEDIUM

(71) Applicant: HTC Corporation, Taoyuan (TW)

(72) Inventors: Ching-Chun Chen, Taoyuan (TW); Tzu-Chieh Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 13 days.

(21) Appl. No.: 17/842,815

(22) Filed: Jun. 17, 2022

(65) Prior Publication Data

US 2023/0229240 A1 Jul. 20, 2023

Related U.S. Application Data

(60) Provisional application No. 63/301,063, filed on Jan. 20, 2022.

(51) Int. Cl.
*G06F 3/01* (2006.01)
*G06F 3/04842* (2022.01)
*G06F 3/04815* (2022.01)

(52) U.S. Cl.
CPC .......... *G06F 3/017* (2013.01); *G06F 3/04815* (2013.01); *G06F 3/04842* (2013.01)

(58) Field of Classification Search
CPC .. G06F 3/017; G06F 3/04815; G06F 3/04842; G06F 3/014; G06F 3/0236; G06F 3/0233
USPC .......................................................... 715/773
See application file for complete search history.

(56) References Cited

U.S. PATENT DOCUMENTS

| | | | | |
|---|---|---|---|---|
| 6,407,679 B1* | 6/2002 | Evans | ..................... | G06F 3/014 400/479.2 |
| 8,884,790 B2* | 11/2014 | Page | ................... | G06F 3/04886 341/23 |
| 9,122,316 B2* | 9/2015 | Li | ......................... | G06F 3/0426 |
| 11,029,147 B2* | 6/2021 | Abovitz | ................. | A63F 13/00 |
| 11,150,800 B1* | 10/2021 | Longest | ............... | G06F 3/0233 |
| 2003/0193478 A1* | 10/2003 | Ng | .......................... | G06F 3/014 345/168 |

(Continued)

FOREIGN PATENT DOCUMENTS

| | | |
|---|---|---|
| CN | 111142675 | 5/2020 |
| CN | 113826058 | 12/2021 |
| TW | 201606567 | 2/2016 |

OTHER PUBLICATIONS

"Office Action of Taiwan Counterpart Application", dated Nov. 28, 2022, p. 1-p. 8.

*Primary Examiner* — Patrick F Riegler
(74) *Attorney, Agent, or Firm* — JCIPRNET

(57) ABSTRACT

The embodiments of the disclosure provide a method for inputting letters, a host, and a computer readable storage medium. The method includes: in response to determining that a first hand is presented as a first gesture, showing at least one letter set; in response to determining that the first hand has been changed from the first gesture to a second gesture corresponding to a first letter set among the at least one letter set, showing a subset of the first letter set, wherein the subset of the first letter set comprises at least one letter; in response to determining that a first letter among the at least one letter of the subset of the first letter set has been chosen, inputting the first letter.

13 Claims, 5 Drawing Sheets

(56) References Cited

U.S. PATENT DOCUMENTS

| | | | |
|---|---|---|---|
| 2007/0182595 A1* | 8/2007 | Ghasabian | G06F 1/163 341/22 |
| 2010/0109915 A1* | 5/2010 | Scarboro | H03M 11/18 341/20 |
| 2010/0235786 A1* | 9/2010 | Maizels | G06F 3/04847 715/810 |
| 2011/0248914 A1* | 10/2011 | Sherr | G06F 3/0237 345/156 |
| 2012/0242581 A1* | 9/2012 | Laubach | G06F 3/04883 345/173 |
| 2014/0267044 A1* | 9/2014 | Andersen | G06F 3/04886 345/168 |
| 2014/0298266 A1* | 10/2014 | Lapp | G06F 3/04886 715/835 |
| 2015/0241968 A1* | 8/2015 | Brehmer | G06F 1/163 345/156 |
| 2015/0242118 A1* | 8/2015 | Zhang | G06F 3/041 715/773 |
| 2016/0026253 A1* | 1/2016 | Bradski | H04N 13/128 345/8 |
| 2016/0364138 A1* | 12/2016 | Luo | G06F 1/1626 |
| 2017/0090747 A1* | 3/2017 | Dash | G06F 1/163 |
| 2018/0246563 A1* | 8/2018 | Kunitomo | G06F 3/04842 |
| 2018/0276895 A1* | 9/2018 | Hodge | G09G 5/003 |
| 2018/0329209 A1* | 11/2018 | Nattukallingal | G02B 27/01 |
| 2020/0117282 A1 | 4/2020 | Lee | |
| 2020/0210675 A1* | 7/2020 | Lee | G06F 3/04886 |
| 2020/0371599 A1* | 11/2020 | Lee | G06F 3/017 |
| 2020/0387214 A1* | 12/2020 | Ravasz | G06F 3/0233 |
| 2020/0387229 A1* | 12/2020 | Ravasz | G06F 3/017 |

* cited by examiner

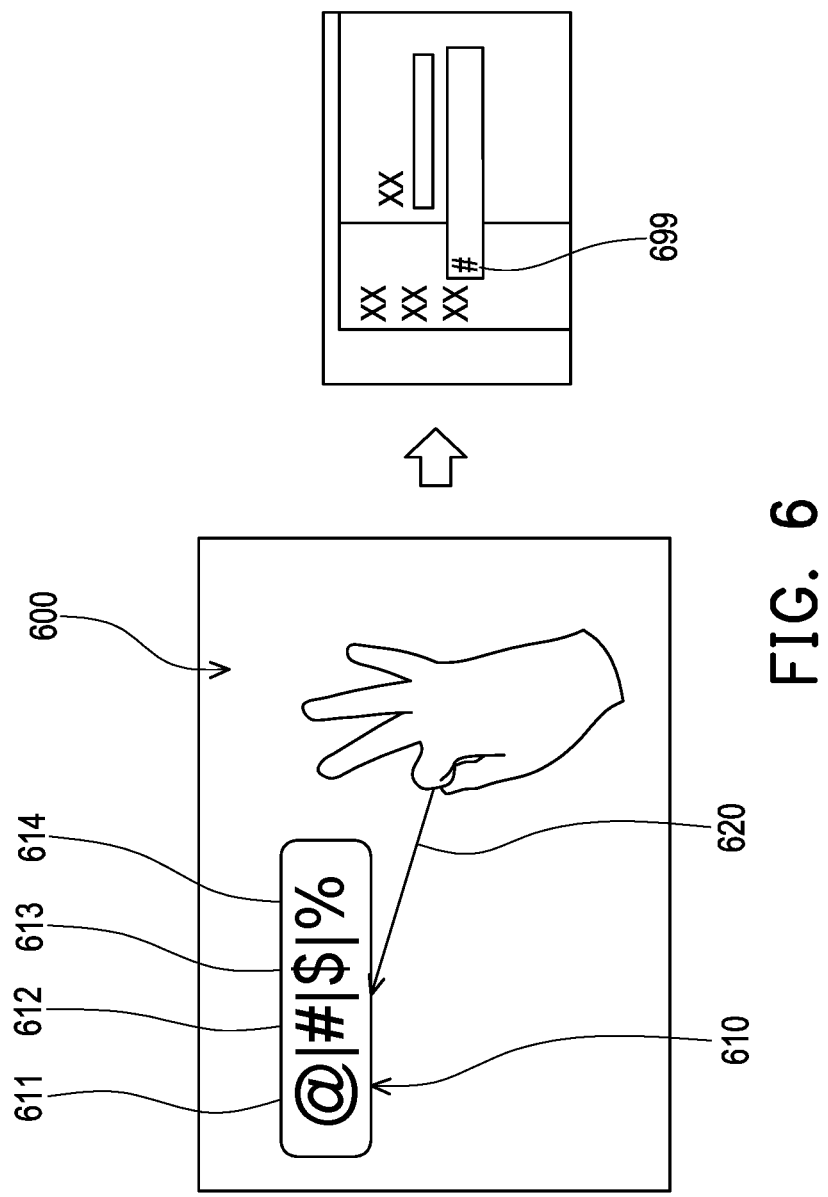

US 11,914,789 B2

METHOD FOR INPUTTING LETTERS, HOST, AND COMPUTER READABLE STORAGE MEDIUM

CROSS-REFERENCE TO RELATED APPLICATION

This application claims the priority benefit of U.S. provisional application Ser. No. 63/301,063, filed on Jan. 20, 2022. The entirety of the above-mentioned patent application is hereby incorporated by reference herein and made a part of this specification.

BACKGROUND

1. Field of the Invention

The present disclosure generally relates to an inputting mechanism, in particular, to a method for inputting letters, a host, and a computer readable storage medium.

2. Description of Related Art

See FIG. 1, which shows a schematic diagram of an input mechanism. In FIG. 1, a host (e.g., a head-mounted display (HMD) for providing reality services such as virtual reality (VR) service or the like) may show a visual content 110 that includes a virtual keyboard 111. In this case, the user of the host can use the hand representative object 112 that corresponds to the hand gesture of the user's hand to virtually touch the keys (e.g., the key 111a) on the virtual keyboard 111, such that the letter/symbol corresponding to the touched key can be inputted into the reality service.

However, for reducing the possibility of the user touching wrong keys on the virtual keyboard 111, the distances between the keys need to be far, such that the area occupied by the virtual keyboard 111 in the visual content 110 may be large. In this case, in the procedure of the user inputting letters, the user needs to move the hands thereof in the air for long distance, which may make the user feel inconvenient and tired.

In addition, when the input mechanism in FIG. 1 is used, the input accuracy may not be satisfying since the fingertips may not be easy to be tracked for being obscured from time to time.

SUMMARY OF THE INVENTION

Accordingly, the disclosure is directed to a method for inputting letters, a host, and a computer readable storage medium, which may be used to solve the above technical problems.

The embodiments of the disclosure provide a method for inputting letters, adapted to a host. The method includes: in response to determining that a first hand is presented as a first gesture, showing at least one letter set; in response to determining that the first hand has been changed from the first gesture to a second gesture corresponding to a first letter set among the at least one letter set, showing a subset of the first letter set, wherein the subset of the first letter set comprises at least one letter; in response to determining that a first letter among the at least one letter of the subset of the first letter set has been chosen, inputting the first letter.

The embodiments of the disclosure provide a host including a storage circuit and a processor. The storage circuit stores a program code. The processor is coupled to the non-transitory storage circuit and accesses the program code to perform: in response to determining that a first hand is presented as a first gesture, showing at least one letter set; in response to determining that the first hand has been changed from the first gesture to a second gesture corresponding to a first letter set among the at least one letter set, showing a subset of the first letter set, wherein the subset of the first letter set comprises at least one letter; in response to determining that a first letter among the at least one letter of the subset of the first letter set has been chosen, inputting the first letter.

The embodiments of the disclosure provide a non-transitory computer readable storage medium, the computer readable storage medium recording an executable computer program, the executable computer program being loaded by a host to perform steps of: in response to determining that a first hand is presented as a first gesture, showing at least one letter set; in response to determining that the first hand has been changed from the first gesture to a second gesture corresponding to a first letter set among the at least one letter set, showing a subset of the first letter set, wherein the subset of the first letter set comprises at least one letter; in response to determining that a first letter among the at least one letter of the subset of the first letter set has been chosen, inputting the first letter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 6 shows a schematic diagram of inputting letters according to an embodiment of the disclosure.

DESCRIPTION OF THE EMBODIMENTS

Figure 1:
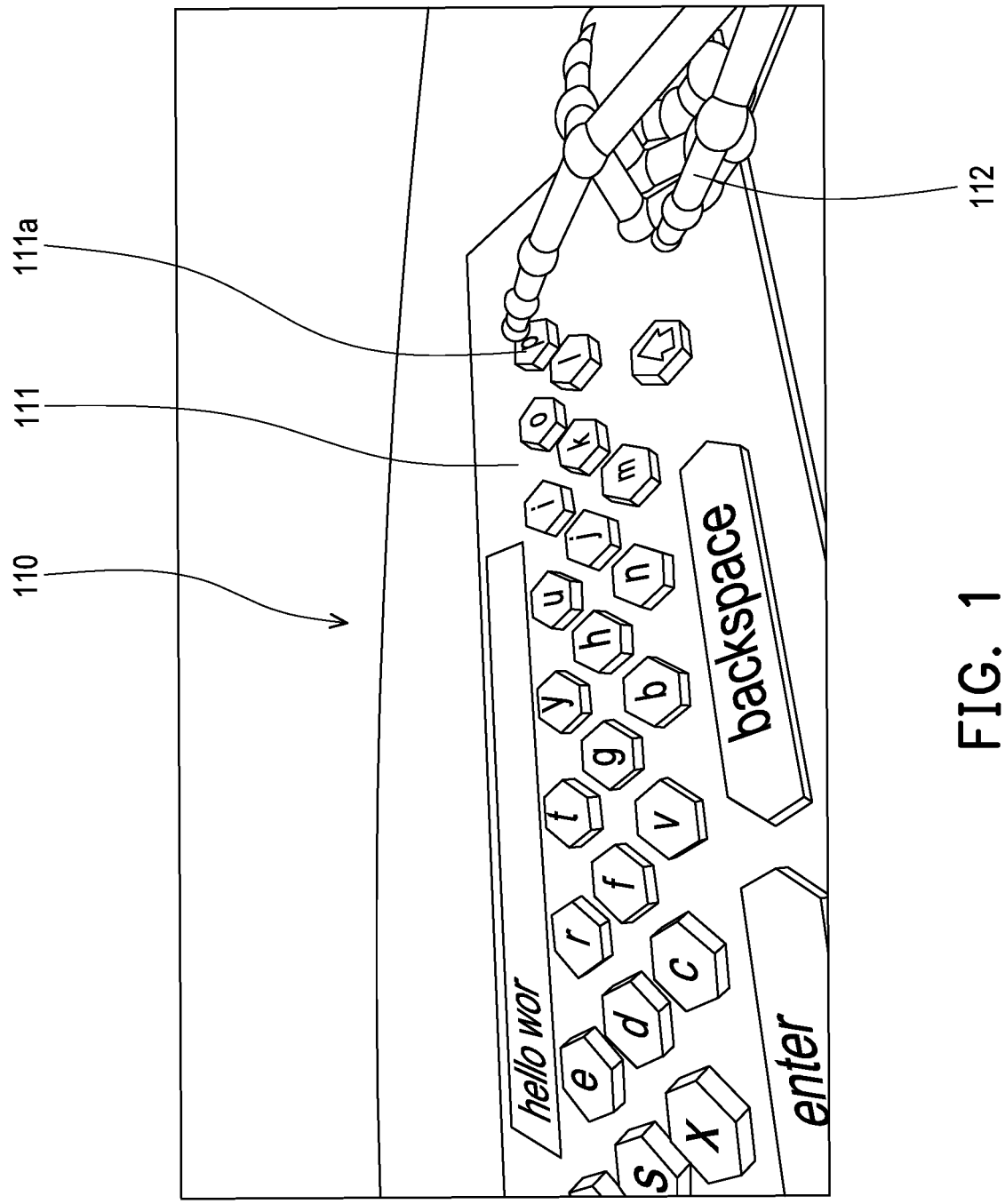
FIG. 1 which shows a schematic diagram of an input mechanism.

Reference will now be made in detail to the present preferred embodiments of the invention, examples of which are illustrated in the accompanying drawings. Wherever possible, the same reference numbers are used in the drawings and the description to refer to the same or like parts.

Figure 2:
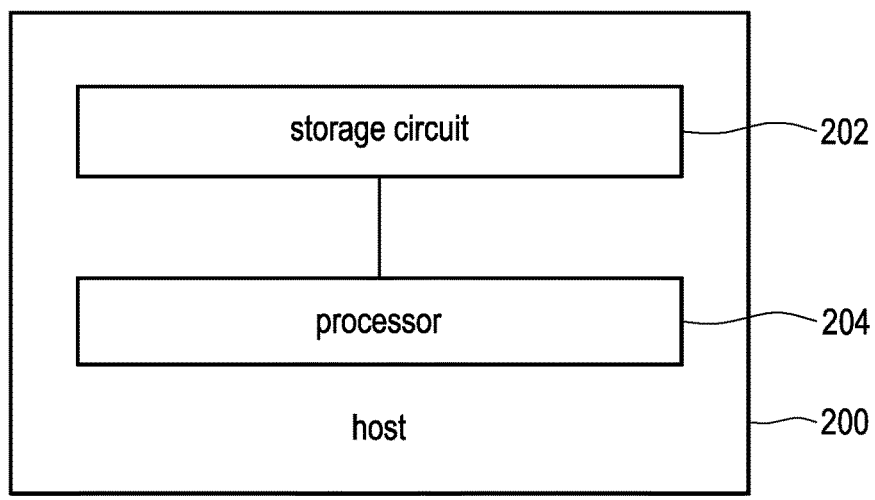
FIG. 2 shows a schematic diagram of a host according to an embodiment of the disclosure.

See FIG. 2, which shows a schematic diagram of a host according to an embodiment of the disclosure. In various embodiments, the host 200 can be any device capable of performing tracking functions (e.g., inside-out tracking and/or outside-in tracking) on one or more to-be-tracked objects (e.g., the hands of the user of the host) within the field of view (FOV) of the host 200. In the embodiments of the disclosure, the FOV can be an image-capturing range of one or more camera (e.g., tracking camera) on the host 200. When the to-be-tracked objects (e.g., the hands) is within the FOV, the cameras on the host 200 may capture images of the to-be-tracked objects, and the host 200 may track the pose of each to-be-tracked object based on the captured images, but the disclosure is not limited thereto.

In some embodiments, the host 200 can track the gesture(s) of the hand(s) in the FOV and accordingly render the corresponding hand representative object(s) in the provided visual content.

In some embodiment, some tracking devices (e.g., tracking cameras) can be disposed in the environment where the host 200 moves. In this case, the tracking devices can be used to track the gestures of the user's hands, and the tracking devices can provide the tracked gesture of the user's hands to the host 200 for further processing/analysis, but the disclosure is not limited thereto.

In the embodiments of the disclosure, the host 200 can be an HMD for providing reality services to the user thereof, wherein the reality services include, but not limited to, a virtual reality (VR) service, an augmented reality (AR) service, an extended reality (XR), and/or a mixed reality, etc. In these cases, the host 200 can show the corresponding visual contents for the user to see, such as VR/AR/XR/MR visual contents.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or program codes that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or program codes stored in the storage circuit 202 to implement the method for inputting letters provided in the disclosure, which would be further discussed in the following.

Figure 3:
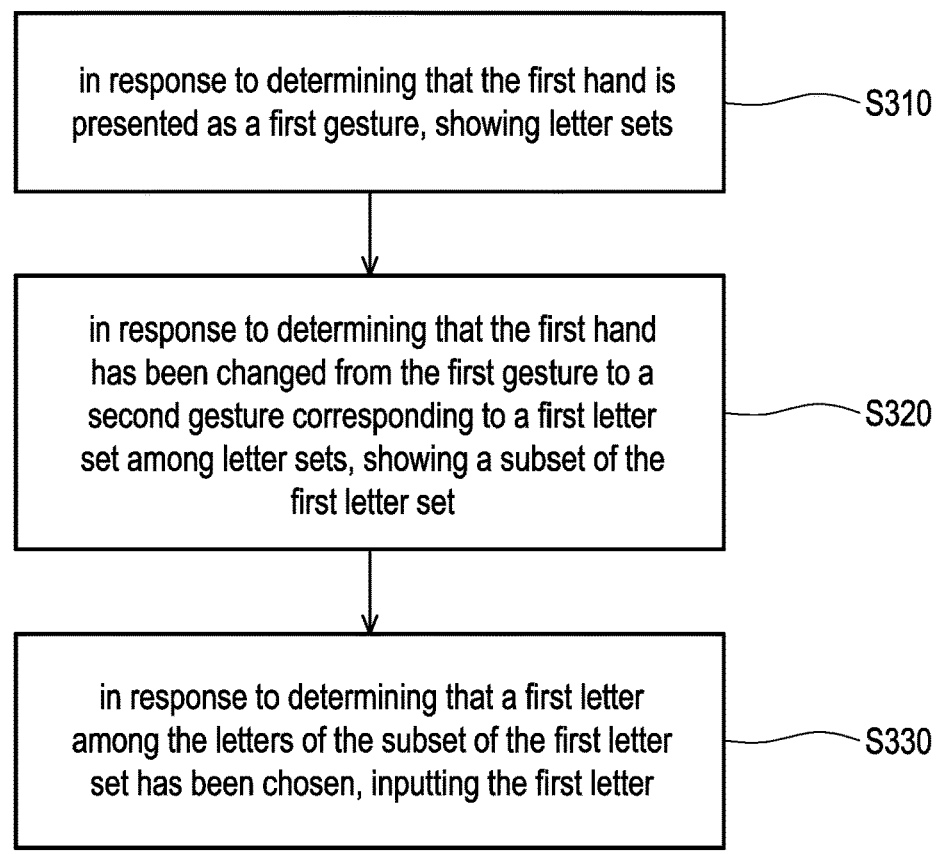
FIG. 3 shows a flow chart of the method for inputting letters according to an embodiment of the disclosure.

See FIG. 3, which shows a flow chart of the method for inputting letters according to an embodiment of the disclosure. The method of this embodiment may be executed by the host 200 in FIG. 2, and the details of each step in FIG. 3 will be described below with the components shown in FIG. 2. In addition, for better understanding the concept of the disclosure, FIG. 4 would be used as an illustrative example, wherein FIG. 4 shows an application scenario according to an embodiment of the disclosure.

Figure 4:
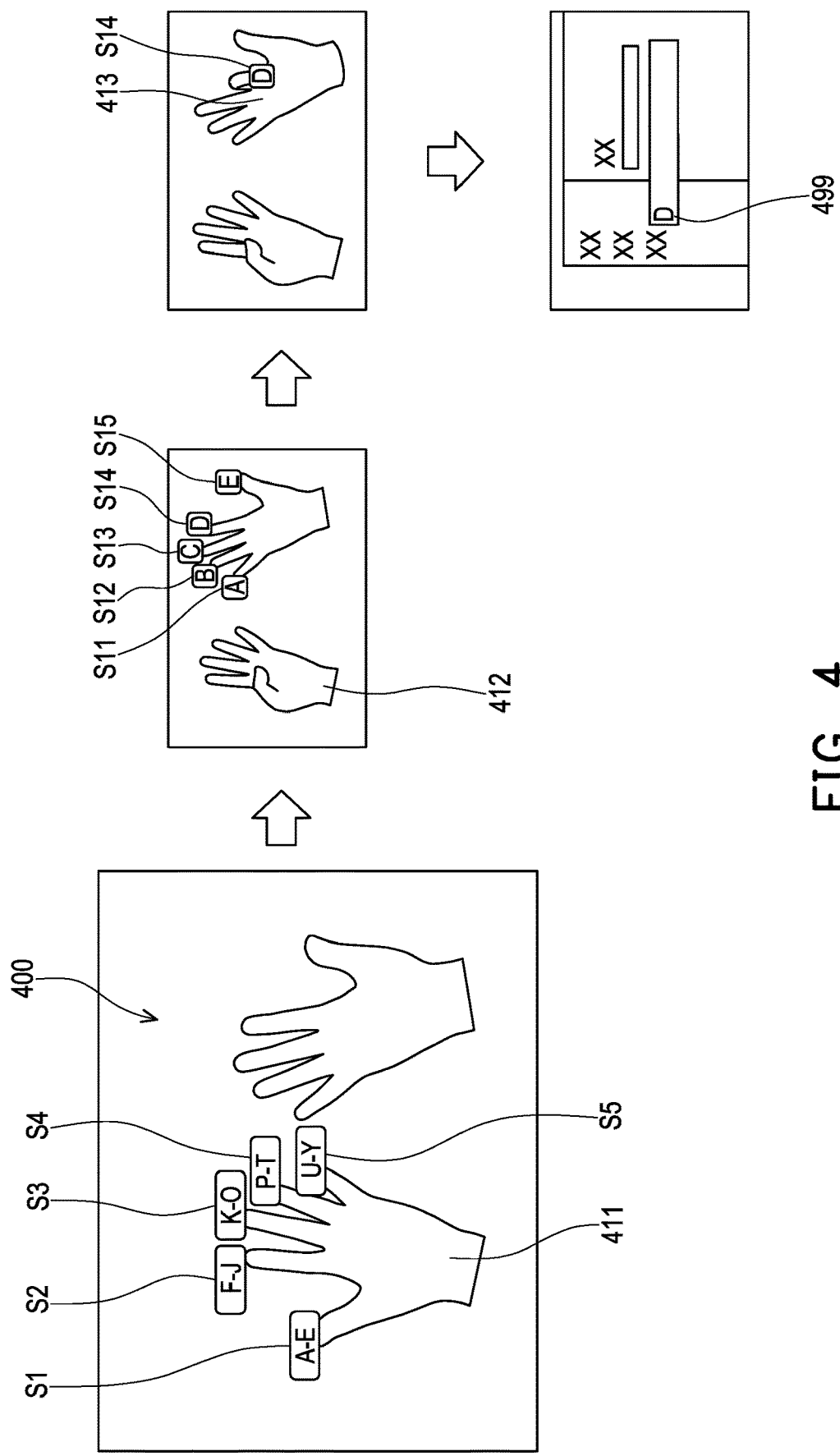
FIG. 4 shows an application scenario according to an embodiment of the disclosure.

In FIG. 4, the processor 204 provides a visual content 400 for the user to see, wherein the visual content 400 may include two hand representative objects rendered based on the gestures of a first hand and a second hand of the user. In the following embodiment, the first and second hand of the user would be respectively assumed to be the left and right hand of the user, but the disclosure is not limited thereto.

In step S310, in response to determining that the first hand is presented as a first gesture 411, the processor 204 shows letter sets S1 to S5. In the embodiments of the disclosure, each letter set S1 to S5 can be shown in the corresponding (floating) icon that indicate one or more letters.

In the embodiment, the letter set S1 may indicate English letters of A to E, the letter set S2 may indicate English letters of F to J, the letter set S3 may indicate English letters of K to O, the letter set S4 may indicate English letters of P to T, and the letter set S5 may indicate English letters of U to Y, but the disclosure is not limited thereto. In other embodiments, the letters indicated in each letter set can be adjusted based on the requirements of the designer and not limited to the case shown in FIG. 4.

In FIG. 4, the considered first gesture 411 may be an open palm gesture, which represents that the first hand (e.g., the left hand) of the user is open and the palm of the first hand is facing the camera of the host 200. In other embodiments, the first gesture 411 can be adjusted to be other type/appearance of gestures. For example, when the first hand (e.g., the left hand) of the user is open and the palm of the first hand is facing away from the camera of the host 200, the corresponding gesture of the first hand can be regarded as the considered first gesture (which may be referred to as a backhand gesture), but the disclosure is not limited thereto.

In the embodiments of the disclosure, the first hand may include first fingers respectively corresponding to the letter sets S1 to S5. In this case, the processor 204 may show each letter sets S1 to S5 at the corresponding first finger. For example, assuming that the letter sets S1 to S5 respectively correspond to the thumb, index finger, middle finger, ring finger, and pinky finger of the first hand of the user, the processor 204 may respectively show the letter sets S1 to S5 at the thumb, index finger, middle finger, ring finger, and pinky finger of the hand representative object corresponding to the first hand as shown in FIG. 4. In one embodiment, the processor 204 may respectively show the letter sets S1 to S5 at the fingertips of the corresponding first fingers as shown in FIG. 4, but the disclosure is not limited thereto.

In the embodiments of the disclosure, the letter sets S1 to S5 can be used to inform that which of the first fingers corresponds to which set of the English letters. For example, the letter set S1 shown at the thumb can be used to inform that the thumb of the first hand correspond to the set of English letters A to E; the letter set S2 shown at the index finger can be used to inform that the index finger of the first hand correspond to the set of English letters F to J; the letter set S3 shown at the middle finger can be used to inform that the middle finger of the first hand correspond to the set of English letters K to O; the letter set S4 shown at the ring finger can be used to inform that the ring finger of the first hand correspond to the set of English letters P to T; the letter set S5 shown at the pinky finger can be used to inform that the pinky finger of the first hand correspond to the set of English letters U to Y.

In the embodiments of the disclosure, when the user wants to input a letter among the letters indicated by any of the letter sets S1 to S5, the user may change the first hand from the first gesture 411 to another gesture corresponding to the letter set including the to-be-inputted letter.

In step S320, in response to determining that the first hand has been changed from the first gesture 411 to a second gesture corresponding to a first letter set among the letter sets S1 to S5, showing a subset of the first letter set.

In one embodiment, during determining whether the first hand has changed from the first gesture 411 to the second gesture, the processor 204 may determine whether one of the first fingers of the first hand performs a triggering movement. In one embodiment, in response to determining that a specific first finger corresponding to the first letter set has performed the triggering movement, the processor 204 may determine that the first hand has been changed from the first gesture 411 to the second gesture corresponding to the first letter set among the letter sets S1 to S5.

In the following embodiment, it is assumed that the user wants to input the letter "D" and the triggering movement is a bending action, but the disclosure is not limited thereto. In this case, the user may change the first hand from the first gesture 411 to the second gesture 412 shown in FIG. 4.

In FIG. 4, the user may bend the thumb corresponding to the letter set S1 (which includes the to-be-inputted letter "D"), and the processor 204 would determine that the first hand has been changed from the first gesture 411 to the second gesture 412, and the processor 204 may regard the letter set S1 corresponding to the thumb as the considered first letter set.

In this case, the processor 204 may accordingly show a subset of the first letter set (i.e., the letter set S1). In FIG. 4, the subset of the letter set S1 may include letters S11 to S15 respectively corresponding to the English letters A to E.

In the embodiments of the disclosure, the letters S11 to S15 can be shown in the corresponding (floating) icon that indicate the corresponding letter. In the embodiments of the disclosure, the second hand may include second fingers respectively corresponding to the letters S11 to S15.

In FIG. 4, the second hand can be assumed to be presented as the same gesture as the first gesture 411 (i.e., the open palm gesture) as well. In other embodiments, the second hand can be assumed to be other type/appearance of gestures, such as the backhand gesture, but the disclosure is not limited thereto.

In this case, the processor 204 may show each letter S11 to S15 at the corresponding second finger. For example, assuming that the letter S11 to S15 respectively correspond to the pinky finger, ring finger, middle finger, index finger, and thumb of the second hand of the user, the processor 204 may respectively show the letter S11 to S15 at the pinky finger, ring finger, middle finger, index finger, and thumb of the hand representative object corresponding to the second hand as shown in FIG. 4.

In the embodiments of the disclosure, the letter S11 to S15 can be used to inform that which of the second fingers corresponds to which of the English letters. For example, the letter S11 shown at the pinky finger can be used to inform that the pinky finger of the second hand correspond to the English letter A; the letter S12 shown at the ring finger can be used to inform that the ring finger of the second hand correspond to the English letter B; the letter S13 shown at the middle finger can be used to inform that the middle finger of the second hand correspond to the English letter C; the letter S14 shown at the index finger can be used to inform that the index finger of the second hand correspond to the English letter D; the letter S15 shown at the thumb can be used to inform that the thumb of the second hand correspond to the English letter E.

In step S330, in response to determining that a first letter among the letters S11 to S15 of the subset of the first letter set (e.g., the letter set S1) has been chosen, the processor 204 inputs the first letter.

In one embodiment, during determining whether the first letter has been chosen, the processor 204 may determine whether a specific second finger corresponding to the first letter of the second hand has been determined to perform the triggering movement. In one embodiment, in response to determining that the specific second finger of the second hand has been determined to perform the triggering movement, the processor 204 determines that the first letter among the letters S11 to S15 of the subset of the first letter set (e.g., the letter set S1) has been chosen.

Since it is assumed that the user wants to input the letter "D" (i.e., the letter S14) and the triggering movement is the bending action, the user may change the second hand from the open palm gesture to the gesture 413 shown in FIG. 4.

In the gesture 413, the user may bend the index finger of the second hand corresponding to the to-be-inputted letter "D" (i.e., the letter S14), and the processor 204 would determine that the specific second finger corresponding to the letter "D" of the second hand has performed the triggering movement. In this case, the processor 204 may regard the letter "D" (i.e., the letter S14) is the first letter and accordingly input the letter "D".

In FIG. 4, the inputted letter "D" can be shown in an input box 499 in the visual content 499, but the disclosure is not limited thereto.

In another embodiment, after step S320, the processor 204 may further determine whether the specific second finger of the second hand has been determined to perform the triggering movement while the first hand is maintained as the second gesture 412. In one embodiment, in response to determining that the specific second finger of the second hand has been determined to perform the triggering movement while the first hand is maintained as the second gesture 412, the processor 204 may determine that the first letter among the letters of the subset of the first letter set has been chosen. Otherwise, the processor 204 may neglect the triggering movement performed by the specific second finger.

To be specific, if the user wants to input the letter "D" (i.e., the letter S14) in FIG. 4, the user needs to maintain the first hand as the second gesture 412 while bending the index finger of the second hand. In this case, the processor 204 would determine that the index finger of the second hand is the specific second finger and accordingly regard the letter "D" (i.e., the letter S14) corresponding to the specific second finger as the chosen first letter.

On the other hand, if the first hand fails to be maintained as the second gesture 412 before the user finishes the triggering movement of the index finger of the second hand, the processor 204 may neglect the triggering movement performed by the index finger of the second hand, but the disclosure is not limited thereto.

In some embodiments, the letters S11 to S15 may move along with the corresponding second finger. In addition, when one of the second fingers is determined to be substantially moving, the letters corresponding to others of the second fingers can be temporarily hidden.

For example, in FIG. 4, when the user bends the index finger of the second hand, the letter S14 may be moved along with the movement of the fingertip of the index finger on the hand representative object corresponding to the second hand. Meanwhile, other letters S11 to S13 and S15 can be hidden during the movement of the index finger of the second hand for not distracting the user, but the disclosure is not limited thereto.

In one embodiment, when the user wants to input another letter, the user may reset the first hand as the first gesture 411 and bending the first finger corresponding to the first letter set including to to-be-inputted letter. After the subset of the first letter set has been shown at the second fingers of the second hand, the user may bend the second finger corresponding to the to-be-inputted letter, and the processor 204 would accordingly input the to-be-inputted letter.

For example, if the user wants to input the letter "F", the user may bend the index finger corresponding to the letter set S2 (which includes the to-be-inputted letter "F") of the first hand after resetting the first hand as the first gesture 411. That is, the letter set S2 is regarded as the considered first letter set in this embodiment. In this case, the processor 204 may respectively show the subset of the letter set S2, which includes the letters F, G, H, I, J. For example, the processor 204 may show the letters F, G, H, I, J at the fingertips of the pinky finger, ring finger, middle finger, index finger, and the thumb of the hand representative object corresponding to the second hand. Afterwards, the user may bend the pinky finger corresponding to the letter "F" of the second hand, and the processor 204 may regard the letter "F" as the chosen first letter and accordingly input the letter "F".

For another example, if the user wants to input the letter "Q", the user may bend the index finger corresponding to the letter set S4 (which includes the to-be-inputted letter "Q") of the first hand after resetting the first hand as the first gesture 411. That is, the letter set S4 is regarded as the considered first letter set in this embodiment. In this case, the processor 204 may respectively show the subset of the letter set S4, which includes the letters P, Q, R, S, T. For example, the processor 204 may show the letters P, Q, R, S, T at the fingertips of the pinky finger, ring finger, middle finger, index finger, and the thumb of the hand representative object corresponding to the second hand. Afterwards, the user may bend the ring finger corresponding to the letter "Q" of the second hand, and the processor 204 may regard the letter "Q" as the chosen first letter and accordingly input the letter "Q".

The mechanism for the user to input other letters can be understood based on the above teachings, which would not be further discussed.

As can be known in the above, the embodiments of the disclosure provide a solution for the user to input letters to the reality services (e.g., the VR service) in a more convenient, accurate and less exhaustive way. For example, instead of moving the hands around in the air for reaching keys in a virtual keyboard, the user can input letters via, for example, bending fingers while maintaining the positions of the hands. In addition, since the visual content 400 does not need to show a virtual keyboard occupying a large area, the usage of the display area of the host 200 can be more efficient.

Noted that although English letters are used as illustrative examples in the above embodiment, the letters/symbols of other languages (e.g., Japanese, Russia, Thai, etc.) can be used to implement the concept of the disclosure.

In some embodiments, the embodiments of the disclosure can provide a further solution for the user input letters/symbols. In the embodiments of the disclosure, the terms "letter" and "symbol" can be interchangeable. That is, the term "letter" is not specifically limited to the concept of letters of languages, but should be understood as including, but not limited to, the concept of symbols, such as period symbols, commas, quotation marks, and even spaces, but the disclosure is not limited thereto.

Figure 5:
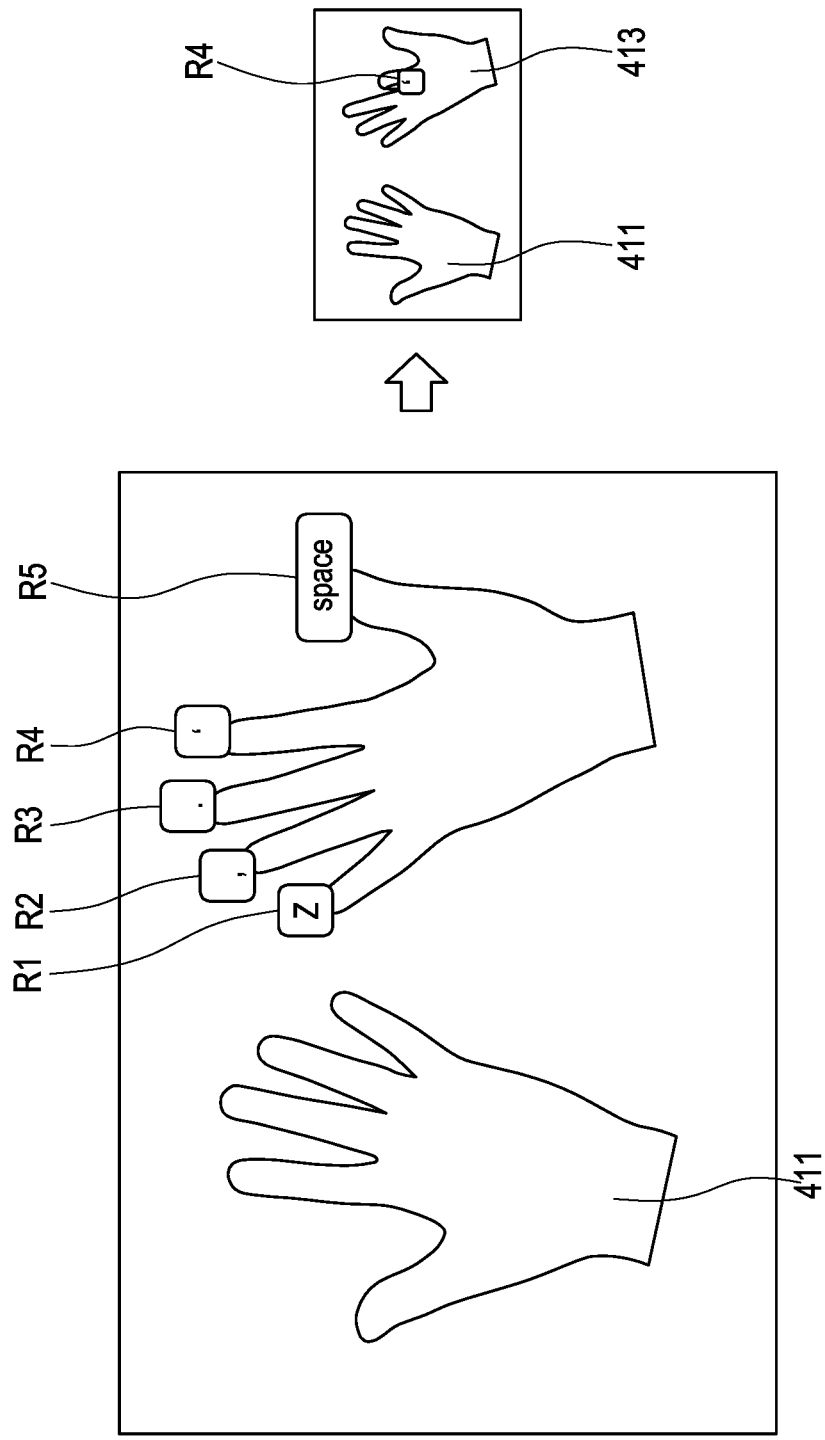
FIG. 5 shows an application scenario according to FIG. 4.

See FIG. 5, which shows an application scenario according to FIG. 4. In FIG. 5, when the processor 204 determines that the first hand is presented as the first gesture 411, the processor 204 can further show reference letters R1 to R5.

In the embodiments of the disclosure, the reference letters R1 to R5 can be shown in the corresponding (floating) icon that indicate the corresponding reference letter. In the embodiments of the disclosure, the second fingers of the second hand may respectively correspond to the reference letters R1 to R5.

In FIG. 5, the second hand can be assumed to be presented as the same gesture as the first gesture 411 (i.e., the open palm gesture) as well. In other embodiments, the second hand can be assumed to be other type/appearance of gestures, such as the backhand gesture, but the disclosure is not limited thereto.

In this case, the processor 204 may show each reference letter R1 to R5 at the corresponding second finger. For example, assuming that the reference letter R1 to R5 respectively correspond to the pinky finger, ring finger, middle finger, index finger, and thumb of the second hand of the user, the processor 204 may respectively show the reference letter R1 to R5 at the pinky finger, ring finger, middle finger, index finger, and thumb of the hand representative object corresponding to the second hand as shown in FIG. 5.

In the embodiments of the disclosure, the reference letter R1 to R5 can be used to inform that which of the second fingers corresponds to which of the letters/symbols. For example, the reference letter R1 shown at the pinky finger can be used to inform that the pinky finger of the second hand correspond to the English letter Z; the reference letter R2 shown at the ring finger can be used to inform that the ring finger of the second hand correspond to the comma; the reference letter R3 shown at the middle finger can be used to inform that the middle finger of the second hand correspond to the period symbol; the reference letter R4 shown at the index finger can be used to inform that the index finger of the second hand correspond to the quotation mark; the reference letter R5 shown at the thumb can be used to inform that the thumb of the second hand correspond to the space.

In one embodiment, the processor 204 may determine whether a first reference letter among the reference letters R1 to R5 has been chosen. If yes, the processor 204 may input the first reference letter.

In one embodiment, during determining whether the first reference letter has been chosen, the processor 204 may determine whether a specific second finger corresponding to the first reference letter of the second hand has been determined to perform the triggering movement. In one embodiment, in response to determining that the specific second finger of the second hand has been determined to perform the triggering movement, the processor 204 determines that the first reference letter among the reference letters R1 to R5 has been chosen.

For example, assuming that the user wants to input the quotation mark and the triggering movement is the bending action, the user may change the second hand from the open palm gesture to the gesture 413 shown in FIG. 5.

In the gesture 413, the user may bend the index finger of the second hand corresponding to the to-be-inputted quotation mark, and the processor 204 would determine that the specific second finger corresponding to the quotation mark of the second hand has performed the triggering movement. In this case, the processor 204 may regard the quotation mark (i.e., the reference letter R4) is the first reference letter and accordingly input the quotation mark.

Similar to the scenario in FIG. 4, the inputted quotation mark can be shown in an input box in the visual content provided by the host 200, but the disclosure is not limited thereto.

In another embodiment, after determining that the first hand is presented as the first gesture 411, the processor 204 may further determine whether the specific second finger of the second hand has been determined to perform the triggering movement while the first hand is maintained as the first gesture 411. In one embodiment, in response to determining that the specific second finger of the second hand has been determined to perform the triggering movement while the first hand is maintained as the first gesture 411, the processor 204 may determine that the first reference letter has been chosen. Otherwise, the processor 204 may neglect the triggering movement performed by the specific second finger.

To be specific, if the user wants to input the quotation mark in FIG. 5, the user needs to maintain the first hand as the first gesture 411 while bending the index finger of the second hand. In this case, the processor 204 would determine that the index finger of the second hand is the specific second finger and accordingly regard the quotation mark corresponding to the specific second finger as the chosen first reference letter.

On the other hand, if the first hand fails to be maintained as the first gesture 411 before the user finishes the triggering movement of the index finger of the second hand, the processor 204 may neglect the triggering movement performed by the index finger of the second hand, but the disclosure is not limited thereto.

In one embodiment, since the combination of bended fingers may not be enough to input all the required letters of the considered language, the embodiments of the disclosure further provide a solution for the user to input.

See FIG. 6, which shows a schematic diagram of inputting letters according to an embodiment of the disclosure. In FIG. 6, the processor 204 may show a virtual keyboard 610 in a visual content 600 provided by the processor 204, wherein the virtual keyboard 610 includes a plurality of keys 611-614. In the embodiments of the disclosure, the keys 611-614 may correspond to a plurality of symbols, and the symbols do not correspond to any of the letter comprised in each letter set S1 to S5.

From another perspective, the virtual keyboard 610 can be regarded as including some keys corresponding to less used symbols rather than regular letters of language, but the disclosure is not limited thereto.

In one embodiment, the processor 204 may show a specific object in the visual content 600 and determines whether the specific object in the visual content 600 is triggered. In one embodiment, the specific object may be any virtual object (e.g., a button or an icon) used for the user to activate the virtual keyboard 610.

In one embodiment, in response to determining that the specific object in the visual content 400 has been triggered, the processor 204 may show the virtual keyboard 610.

After showing the virtual keyboard 610, the processor 204 may determine whether any key of the keys 611-614 has been triggered. In response to determining that a first key among the keys 611-614 has been triggered, the processor 204 may input a first symbol of the symbols, wherein the first symbol corresponds to the first key.

In FIG. 6, the processor 204 may determine a raycast 620 corresponding to the user of the host 200 in the visual content 600. In one embodiment, the raycast 620 may be a regular VR raycast used by the user to point to any object in the visual content 600. In this case, the processor 204 may determine whether the user performs a selection action while the raycast 620 is pointing to the first key. If yes, the processor 204 may determine that the first key among the keys 611-614 has been triggered.

In one embodiment, the selection action may be assumed to be a pinch action. In this case, if the user wants to input the symbol "#" corresponding to the key 612, the user may use the raycast 620 to point to the key 612 and do a pinch action while the raycast 620 is pointing to the key 612. Accordingly, the processor 204 would determine that the key 612 has been triggered and input the symbol "#" corresponding to the key 612 to an input box 699 in the visual content 600.

The disclosure further provides a computer readable storage medium for executing the method for inputting letters. The computer readable storage medium is composed of a plurality of program instructions (for example, a setting program instruction and a deployment program instruction) embodied therein. These program instructions can be loaded into the host 200 and executed by the same to execute the method for inputting letters and the functions of the host 200 described above.

In summary, the embodiments of the disclosure provide a solution for the user to input letters to the reality services (e.g., the VR service) in a more convenient, accurate and less exhaustive way. For example, instead of moving the hands around in the air for reaching keys in a virtual keyboard, the user can input letters via, for example, bending fingers while maintaining the positions of the hands.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for inputting letters, adapted to a host, wherein the host is a head-mounted display providing a visual content of a reality service, and the method comprises:
   providing a first hand representative object in the visual content, wherein the first hand representative object is rendered based on a first hand, wherein the first hand representative object comprises at least one finger;
   in response to determining that the first hand is presented as a first gesture, showing each of at least one letter set at the corresponding finger of the first hand representative object in the visual content, wherein the first hand comprises a specific first finger corresponding to a first letter set among the at least one letter set;
   in response to determining that the specific first finger of the first hand has been determined to perform a first bending action as a triggering movement, determining that the first hand has been changed from the first gesture to a second gesture corresponding to the first letter set;
   in response to determining that the first hand has been changed from the first gesture to the second gesture corresponding to the first letter set among the at least one letter set, showing all letters of the first letter set in the visual content, wherein a second hand comprises a specific second finger corresponding to a first letter among the letters of the first letter set;
   in response to determining that the specific second finger of the second hand has been determined to perform a second bending action as the triggering movement while the first hand is maintained as the second gesture, determining that the first letter among the letters of the first letter set has been chosen;
   in response to determining that the first letter among the letters of the first letter set has been chosen, inputting the first letter.

2. The method according to claim 1, wherein the first gesture is an open palm gesture.

3. The method according to claim 1, wherein the letters of the first letter set respectively corresponds to at least one second finger on the second hand, and the step of showing all letters of the first letter set comprises:
   showing each letter of the first letter set at the corresponding second finger.

4. The method according to claim 1, wherein in response to determining that the first hand is presented as the first gesture, the method further comprises:
showing at least one reference letter;
in response to determining that a first reference letter among the at least one reference letter has been chosen, inputting the first reference letter.

5. The method according to claim 4, wherein the at least one reference letter of respectively corresponds to at least one second finger on the second hand, the second hand comprises the specific second finger corresponding to the first reference letter, and the method further comprises:
showing each reference letter at the corresponding second finger;
in response to determining that the specific second finger of the second hand has been determined to perform the triggering movement, determining that the first reference letter has been chosen.

6. The method according to claim 4, wherein the at least one reference letter of respectively corresponds to at least one second finger on the second hand, the second hand comprises the specific second finger corresponding to the first reference letter, and the method further comprises:
showing each reference letter at the corresponding second finger;
in response to determining that the specific second finger of the second hand has been determined to perform the triggering movement while the first hand is maintained as the first gesture, determining that the first reference letter has been chosen.

7. The method according to claim 1, further comprising:
showing a virtual keyboard, wherein the virtual keyboard comprises a plurality of keys;
in response to determining that a first key among the keys has been triggered, inputting a first symbol of the symbols, wherein the first symbol corresponds to the first key.

8. The method according to claim 7, wherein the keys correspond to a plurality of symbols, and the symbols do not correspond to any of the letter comprised in each letter set.

9. The method according to claim 7, wherein before the step of showing the virtual keyboard, the method further comprises:
showing a specific object in the visual content;
in response to determining that the specific object in the visual content has been triggered, showing the virtual keyboard.

10. The method according to claim 7, further comprising:
determining a raycast corresponding to a user in the visual content;
in response to determining that the user performs a selection action while the raycast is pointing to the first key, determining that the first key among the keys has been triggered.

11. A host, wherein the host is a head-mounted display providing a visual content of a reality service, and comprises:
a non-transitory storage circuit, storing a program code;
a processor, coupled to the non-transitory storage circuit and accessing the program code to perform:
providing a first hand representative object in the visual content, wherein the first hand representative object is rendered based on a first hand, wherein the first hand representative object comprises at least one finger;
in response to determining that the first hand is presented as a first gesture, showing each of at least one letter set at the corresponding finger of the first hand representative object in the visual content, wherein the first hand comprises a specific first finger corresponding to a first letter set among the at least one letter set;
in response to determining that the specific first finger of the first hand has been determined to perform a first bending action as a triggering movement, determining that the first hand has been changed from the first gesture to a second gesture corresponding to the first letter set;
in response to determining that the first hand has been changed from the first gesture to the second gesture corresponding to the first letter set among the at least one letter set, showing all letters of the first letter set in the visual content, wherein a second hand comprises a specific second finger corresponding to a first letter among the letters of the first letter set;
in response to determining that the specific second finger of the second hand has been determined to perform a second bending action as the triggering movement while the first hand is maintained as the second gesture, determining that the first letter among the letters of the first letter set has been chosen;
in response to determining that the first letter among the letters of the first letter set has been chosen, inputting the first letter.

12. The host according to claim 11, wherein the letters of the first letter set respectively corresponds to at least one second finger on the second hand, and the processor performs:
showing each letter of the first letter set at the corresponding second finger.

13. A non-transitory computer readable storage medium, the computer readable storage medium recording an executable computer program, the executable computer program being loaded by a host, wherein the host is a head-mounted display providing a visual content of a reality service, and the executable computer program performs steps of:
providing a first hand representative object in the visual content, wherein the first hand representative object is rendered based on a first hand, wherein the first hand representative object comprises at least one finger;
in response to determining that the first hand is presented as a first gesture, showing each of at least one letter set at the corresponding finger of the first hand representative object in the visual content, wherein the first hand comprises a specific first finger corresponding to a first letter set among the at least one letter set;
in response to determining that the specific first finger of the first hand has been determined to perform a first bending action as a triggering movement, determining that the first hand has been changed from the first gesture to a second gesture corresponding to the first letter set;
in response to determining that the first hand has been changed from the first gesture to the second gesture corresponding to the first letter set among the at least one letter set, showing all letters of the first letter set in the visual content, wherein a second hand comprises a specific second finger corresponding to a first letter among the letters of the first letter set;
in response to determining that the specific second finger of the second hand has been determined to perform a second bending action as the triggering movement while the first hand is maintained as the second gesture, determining that the first letter among the letters of the first letter set has been chosen;

in response to determining that the first letter among the letters of the first letter set has been chosen, inputting the first letter.

\* \* \* \* \*